United States Patent Office 3,395,041
Patented July 30, 1968

3,395,041

TREATMENT OF HAIR WHICH HAS PREVIOUSLY BEEN TREATED WITH A RESIN COMPOSITION

Du Yung Hsiung, Park Forest, Ill., assignor to The Gillette Company, Boston, Mass., a corporation of Delaware No Drawing. Filed Nov. 24, 1964, Ser. No. 413,607
5 Claims. (Cl. 132—7)

ABSTRACT OF THE DISCLOSURE

Hair tress bearing a dry deposit of resin softenable by a volatile solvent is arranged in a desired pattern, then sprayed with a volatile solvent for the resin and allowed to dry. The solvent may contain up to 0.25% by weight of resin dissolved therein.

This invention relates to a method and composition for setting hair, in particular hair which has previously been treated with a resin composition.

It is conventional to style hair in a desired configuration, then fix it in position by spraying on the hair a solution in a volatile solvent of a resin composition. These resin compositions, which are often pressure packaged, employ a great variety of resin materials as will be hereinafter described, usually within a concentration range of 1.0% to 3.0% based upon the weight of the package contents, or approximately 2% to 6% based on the weight of the volatile solvent. It has generally been found that lesser quantities of resin fixative are insufficient to provide the set improving properties desired in a product of this type. While these products have achieved considerable success and widespread popularity, they suffer from the disadvantage that repeated use leads to excessive accumulation of resin composition on the hair, necessitating more frequent shampooing than is the case when no fixative products are employed. This is particularly troublesome because combing the hair to correct even a minor disarrangement of a small portion of a hair style fixed in such a manner leads to further breaking of resin bonds and decreasing the effectiveness of the fixative and may necessitate re-application of the resin composition to a major portion of the head of hair.

It has now been found that tresses of hair which have been fixed or set by the application of such a resin composition can be reset as desired simply by arranging the fibers of the tresses in the desired pattern, as by combing, brushing, etc., then spraying the hair with a volatile solvent for the resin instead of with a resin solution. Where the accumulation of resin is substantial, as after several days of use of a conventional product, it has been found that satisfactory setting can be achieved by use of volatile solvent compositions containing no resin fixative whatsoever. However, where the resin accumulation is the result of but one or two days of application, it may be desirable to employ a volatile solvent composition containing a small amount of a conventional resin fixative to maintain the accumulation of resin upon the hair at an effective level. It should be understood however that the invention comprehends the use of only those compositions having resin concentration levels up to 0.25% by weight, far below those practiced in the art, which compositions are incapable of appreciable set holding effect except when applied to hair already bearing an accumulation of resin composition. Any resin fixative dissolved in the solvent composition may be identical with or different from that in the dried deposit already on the hair fibers. When the volatile solvent solutions of this invention are employed either with or without the low concentrations of resin fixative, the penetrating and softening effect of the solvent on the dry deposit of resin composition on the hair is sufficiently rapid so that the composition behaves as if it were freshly deposited and fixes the hair in the new configuration as soon as the solvent evaporates.

The present invention is effective with hair bearing a dry deposit of any of the conventional hair fixing or setting resin compositions among which are those containing polyvinyl pyrollidone; copolymers of vinyl pyrollidone with vinyl acetate or vinyl propionate; copolymers of vinyl acetate with crotonic acid; copolymers of maleic anhydride with vinyl alkyl ethers such as vinyl methyl ether; copolymers of maleic anhydride with ethylene or styrene; dimethylhydantoin formaldehyde resin; copolymers of ethylene with vinyl acetate; cellulose ethers, e.g. ethyl cellulose; cellulose esters, e.g. cellulose acetate, cellulose propionate, cellulose aceto-butyrate; sodium carboxy methyl cellulose; polyvinylimidazole; acrylic resins, e.g. polymers and copolymers of ethyl acrylate, methyl methacrylate, butyl acrylate, copolymers of diethylaminoethyl methacrylate with lauryl methacrylate (which may be quaternized in whole or in part with dimethyl sulfate); polyvinyl butyral; shellac; and the like. The maleic anhydride copolymers include those which are partially esterified with alcohols or ether alcohols, or partially amidated with aliphatic amines. All of the resins are film forming.

The preferred hair fixing and setting compositions for use in the present invention comprise certain modified film-forming copolymers of maleic anhydride which before modification have a specific viscosity of 0.3 to 0.7. The copolymers include those of maleic anhydride with vinyl methyl ether, vinyl ethyl ether, vinyl methoxy ethyl ether, or with ethylene, the proportion of maleic anhydride being approximately equal to that of the other ingredients of the copolymers. These preferred copolymers are modified by reacting all of the anhydride groups with a hydroxy-containing compound or with an amine. The anhydride group, upon reacting, forms (1) a carboxylic ester or amide group and, simultaneously, (2) a carboxyl group. The carboxyl groups so formed can themselves be reacted to form additional ester or amide groups. Consequently, the modified copolymer can be defined as one in which from 40% to 60%, preferably about 50%, of the total carboxyl groups (the total which could be formed by hydrolysis of all the anhydride groups) present in the copolymer are reacted with aliphatic alcohols having 2–22 carbon atoms or aliphatic amines having 4–22 carbon atoms to form either partial esters, partial amides or mixed partial ester amides, the remaining carboxyl groups existing as free carboxyl groups. Especially preferred are copolymers of maleic anhydride and vinyl methyl ether which have been reacted to form the ethyl ester or mixed ethyl-fatty alcohol ester derivatives. By "fatty alcohol" we include the aliphatic straight or branched chain alcohols containing from 10 to 22 carbon atoms.

The solubility of the deposited dried film in any particular solvent composition need only be sufficient to provide a softening of the film sufficient to permit the hair to be reformed into the desired new hair style, and the term "softenable" is used to refer to this extent of solubility in the present specification and claims. Accordingly, a wide variety of volatile solvents or softeners may be used in the present invention including isopropylalcohol, ethyl acetate, methylene chloride, 1,1,1-trichloroethane, 1,1,2-trichloro-1,2,2-trifluoroethane, ethyl alcohol and mixtures thereof. The solvent or softener must be a liquid at room temperature and preferably vaporizes at least as rapidly as water at room temperature, i.e. it must have a boiling point from about 30° to about 95° C. Where it is desired to use water as a portion of the volatile solvent mixture, up to 70% by weight of water may be mixed with ethyl alcohol. Of these compositions, ethyl alcohol, mixtures of ethyl alcohol with water and mixtures of ethyl alcohol with halogenated hydrocarbons containing up to and including two carbon atoms are preferred.

The volatile solvent or softener compositions employed in the present invention are preferably applied to the hair by spraying either from an atomizer actuated by a squeeze bulb or pump or from a pressurized package containing the solvent along with a liquefied gaseous propellant in a closed container. Any of the usual propellants may be employed. When the solvent is anhydrous, the halogenated hydrocarbon propellants are preferred because of their non-flammability; these include among others trichloromonofluoromethane, dichlorodifluoromethane, and dichlorotetrafluoroethane, as well as mixtures of two or more of them. Vinyl chloride may also be employed in admixture with any one or more of the foregoing in amounts up to 15% to 20% by weight of the total propellant. The halogenated hydrocarbon propellant generally amounts to 40% to 75% by weight of the total composition, the balance being the volatile solvent either with or without a small amount of resin fixative, up to 0.25% by weight of the solvent or softener.

Liquefied gaseous hydrocarbon propellants such as isobutane or n-butane may also be employed with either anhydrous or aqueous solvent compositions. In general, such hydrocarbon propellants need be present in the pressure package only in amounts somewhat less than 25% by weight of the total composition, the balance being the volatile solvent with or without the aforesaid small amount of fixative.

While the application to hair (bearing a dry deposit of resin fixative) of a volatile solvent alone or containing up to 0.25% resin will suffice for the purpose of the present invention, there may also be included in the solvent, if desired, a small quantity of a hair conditioning agent such as a fatty quaternary cationic surfactant such as stearyldimethylbenzyl ammonium chloride or a small amount of various lanolin fractions, fatty ester oils, such as isopropyl myristate, or of a silicone oil. However, since these conditioning agents and oils are frequently present in the original resin fixative composition and remain on the hair along with the resin, their inclusion in the solvent composition is usually not needed. Perfume may also be included in the solvent composition, if desired, but since it also tends to remain on the hair along with the resin composition it is usually preferred to omit this constituent as well.

The following specific examples are intended to illustrate more fully the nature of the present invention without being intended as a limitation upon the scope thereof.

Example 1

A copolymer of vinyl methyl ether with maleic anhydride (1:1) having a specific viscosity of 0.3 to 0.7 was added slowly and with stirring to ethyl alcohol in an amount sufficient to form a 4% by weight solution. During dissolution esterification occurred so that the solution contained a copolymer having 50% of the total carboxyl groups esterified with ethyl alcohol, the remainder being present as free carboxyl groups. To 30 parts by weight of this solution were added 0.2 part by weight of liquid dimethyl polysiloxane (viscosity 10 centipoises), 0.06 part by weight of oleic acid, and 0.04 part by weight of triisopropanolamine. This solution was then charged into a pressure container along with 45.5 parts by weight of Freon 11 and 25.5 parts by weight of Freon 12.

A tress of Caucasian hair approximately two inches wide, five inches long and weighing about 1.5 gram was wet with water, pin curled into two oppositely wound curls, and dried overnight in an atmosphere of 30% R.H. at a temperature of approximately 70° F. The tress was then styled with a comb into a single rolled curl, sprayed with the above-described composition with the nozzle held at a distance of eight inches from the curl. Spraying was continued for four seconds. The curl was then allowed to dry for thirty minutes at room temperature whereupon the curl was found to be well set by means of the dry residual deposit of resinous polymer.

The setting or fixative effect of the resin hair spray was measured by exposing the sprayed and dried tress to an atmosphere of 84% R.H. at 70° F. for an hour while held in a vertical position and measuring the distance by which the bottom of the tress fell under the influence of gravity under these conditions. The fall was found to amount to 0.7 centimeter as compared to 6.2 centimeters for an identical hair tress which had not been sprayed with resin composition.

The set was destroyed by thoroughly combing out the resin-sprayed hair tress and it was then restyled into the single rolled curl configuration. The fixative effect of the resin hair spray was largely destroyed when the hair fibers were disarranged by the combing step as shown by the fact that the extent of fall of the hair tress measured under the same conditions as outlined above was 4.2 centimeters.

The combed-out, resin-sprayed hair tress was then again wet with water, pin curled, dried, and styled, and was then sprayed for four seconds with ethyl alcohol from a pressurized package containing 30% by weight of ethyl alcohol and 70% by weight of a mixture of 65 parts of trichloromonofluoroethane with 35 parts of weight of dichlorodifluoromethane. The nozzle of the pressurized container was held at a distance of eight inches from the hair tress. After drying for thirty minutes at room temperature, the fixative effect on the hair tress of the dry deposit of residual resinous polymer was found to be completely restored. The extent of fall of this hair tress measured under the same conditions outlined above was only 0.7 centimeter.

Hair which carried no dry deposit of resinous material, when sprayed with ethyl alcohol from the pressure package, showed no difference at all in set retention effect from untreated hair.

Similar results are obtained using other volatile solvents, such as the isopropyl alcohol, etc., listed above.

Example 2

A hair tress was saturated with a commercially available hair setting lotion containing a copolymer of 2-diethylaminoethyl methacrylate with lauryl methacrylate (quaternized 80% with dimethyl sulfate) and was then wound on a plastic roller ⅝ inch in diameter and dried overnight in an atmosphere of 30% R.H. at a temperature of approximately 70° F. The tress was then thoroughly combed out and restyled into a single roll curl. When tested for set retention under the conditions outlined in Example 1 above, it was found to have less set retention than untreated hair, the extent of fall being 9.2 centimeters.

When a tress prepared as described in the preceding paragraph was sprayed with a solvent consisting of approximately 56% by weight of ethyl alcohol and the remainder water from a pressurized package containing in addition to the solvent 20% by weight of n-butane liquefied hydrocarbon propellant, the set retention effect of the dry deposit of resinous polymer was found to be largely restored, the extent of fall of the tress when measured under the standard conditions of Example 1 being 3.4 centimeters.

Example 3

A tress was prepared as described in Example 2 above except that the setting lotion employed was a commercially available product containing a copolymer of vinyl pyrollidone with vinyl acetate (70/30). After combing, the tress displayed less set retention than did an untreated tress, the extent of fall being 7.9 centimeters. The tress was then sprayed with ethyl alcohol from a pressurized container as described in Example 1 except that the alcohol contained 0.25% by weight of a partially esterified copolymer of vinyl methyl ether and maleic anhydride prepared by dissolving the copolymer in ethyl alcohol. The fixative effect of the dry deposit of resinous copolymer was found to be restored to the same extent as in the case of Example 2. When previously untreated hair was sprayed with this dilute ethyl alcohol solution, however, the set retention properties of the hair were substantially unchanged.

Example 4

Two groups of twelve women each representing a variety of hair types and conditions were supplied with identical pressure packages containing commercially available hair spray comprising a copolymer of vinyl acetate with crotonic acid. One of the groups was instructed to use the hair spray in the usual manner. The other group was supplied, in addition, with pressure packages containing 30% by weight of ethyl alcohol as described in Example 1 above and was instructed to use the solvent spray alternately with the resin spray.

After three to four days of use, the majority of subjects in the first group complained that their hair had become gummy, stiff, tacky, and dull and that combing was very difficult, severe brushing to remove excessive resinous polymer being necessary in some cases. The second group, on the other hand, making alternate use of solvent spray, displayed equally good set holding properties with much more satisfactory hair feel and appearance and much less accumulation of resinous polymer.

Although specific embodiments have been herein described, it is not inteded to limit the invention solely thereto but to include all of the obvious variations and modificatons within the spirit and scope of the appended claims.

What is claimed is:

1. The method of setting a hair tress bearing a dry deposit of resin softenable by a volatile solvent which comprises arranging the fibers of said tress in the desired pattern, then spraying the tress with a volatile solvent composition for said resin containing 0 to 0.25% by weight of resin dissolved therein to soften said deposit and allowing said solvent to evaporate, said solvent having a boiling point from about 30 to about 95° C.

2. The method as claimed in claim 1 in which the resin dissolved in said solvent composition is selected from the class consisting of polyvinyl pyrollidone, copolymers of vinyl pyrollidone with vinyl acetate, copolymers of vinyl pyrollidone with vinyl propionate, copolymers of vinyl acetate with crotonic acid, copolymers of maleic anhydride with vinyl alkyl ethers, copolymers of maleic anhydride with ethylene, copolymers of maleic anhydride with styrene, partial esters and partial amides and partial mixed ester amides of said maleic anhydride copolymers, dimehylhydantoin formaldehyde resin, copolymers of ethylene with vinyl acetate, cellulose ethers, cellulose esters, sodium carboxy methyl cellulose, polyvinyl butyral, polyvinyl imidazole, acrylic resins; and shellac.

3. The method as claimed in claim 1 in which the volatile solvent is selected from the class consisting of ethyl alcohol, isopropyl alcohol, ethyl acetate, methylene chloride, 1,1,1-trichloroethane, 1,1,2-trichloro-1,2,2-trifluoroethane, mixtures thereof, and mixtures of ethyl alcohol with up to 70% by weight of water.

4. The method of setting a hair tress bearing a dry deposit of resin softenable by a volatile solvent composition comprising ethyl alcohol, which method comprises arranging the fibers of said tress in the desired pattern, then spraying the tress with a volatile solvent composition for said resin comprising ethyl alcohol and containing 0 to 0.25% by weight of resin dissolved therein to soften said deposit and allowing said solvent to evaporate.

5. The method as claimed in claim 4 in which said resin is a partially esterified copolymer of maleic anhydride with vinyl alkyl ether and the volatile solvent is selected from the class consisting of ethyl alcohol, mixtures of ethyl alcohol with water, and mixtures of ethyl alcohol with halogenated hydrocarbons containing up to two carbon atoms.

References Cited

UNITED STATES PATENTS

| | | | |
|---|---|---|---|
| 2,995,278 | 8/1961 | Clapp. | |
| 3,068,151 | 12/1962 | Haefele | 167—87.1 |
| 3,177,119 | 4/1965 | Zoebelein | 167—87.1 |
| 3,210,251 | 10/1965 | Klug | 167—87 |
| 3,251,743 | 5/1966 | Hahn et al. | 167—87.1 X |

FOREIGN PATENTS

| | | |
|---|---|---|
| 902,808 | 8/1962 | Great Britain. |
| 1,262,724 | 4/1961 | France. |
| 694,866 | 9/1964 | Canada. |

OTHER REFERENCES

Harris: The Journal of the Society of Cosmetic Chemists, vol. 14, No. 10, October 1963, pp. 469–477 relied on (article pp. 469–490).

Minford: The Journal of the Society of Cosmetic Chemists, vol. 15, No. 6, May 1964, pp. 316, 318–319 and 323 relied on (article pp. 311–326).

ALBERT T. MEYERS, *Primary Examiner.*

V. C. CLARKE, *Assistant Examiner.*